3 Sheets--Sheet 1.

J. A. COLEMAN.
Systems of Supplying Steam, &c., to Buildings for Extinguishing Fires.

No. 141,034. Patented July 22, 1873.

Witnesses:
N. W. Stearns
F. E. Teschemacher

Inventor,
John A. Coleman

3 Sheets--Sheet 2.
J. A. COLEMAN.
Systems of Supplying Steam, &c., to Buildings for Extinguishing Fires.
No. 141,034. Patented July 22, 1873.
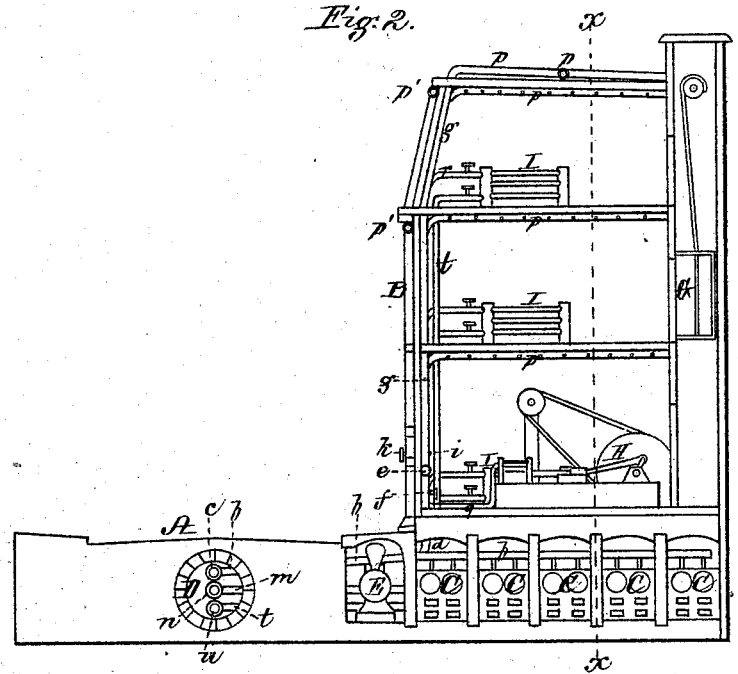
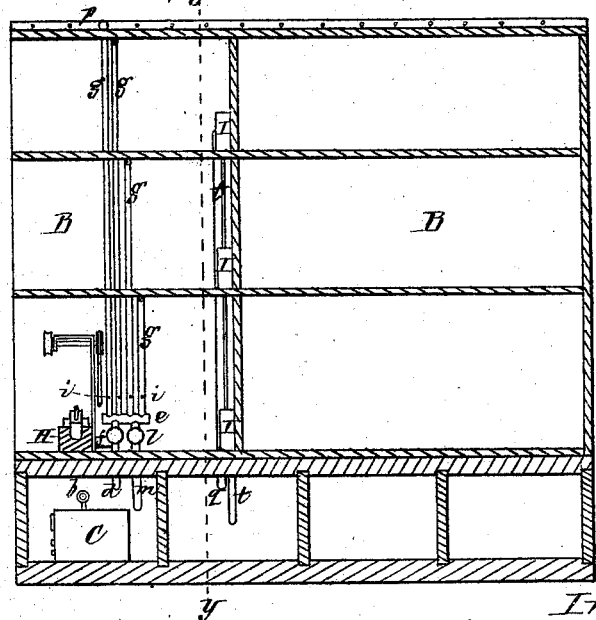
Witnesses,
N. W. Stearns
Inventor,
John A. Coleman J. A. COLEMAN.
Systems of Supplying Steam, &c., to Buildings for Extinguishing Fires.

No. 141,034.   Patented July 22, 1873.

Witnesses,
N. W. Stearns

Inventor,
John A. Coleman

UNITED STATES PATENT OFFICE.

JOHN A. COLEMAN, OF PROVIDENCE, RHODE ISLAND.

IMPROVEMENT IN SYSTEMS OF SUPPLYING STEAM, &c., TO BUILDINGS FOR EXTINGUISHING FIRES.

Specification forming part of Letters Patent No. 141,034, dated July 22, 1873; application filed March 25, 1873.

*To all whom it may concern:*

Be it known that I, JOHN A. COLEMAN, of Providence, in the county of Providence and State of Rhode Island, have invented a system for supplying steam or steam and water from a central station to buildings throughout a city or district for extinguishing fires, the steam also being employed for motive power, heating purposes, &c., of which the following is a full, clear, and exact description, reference being had to the accompanying drawings making part of this specification, in which—

Figure 1:
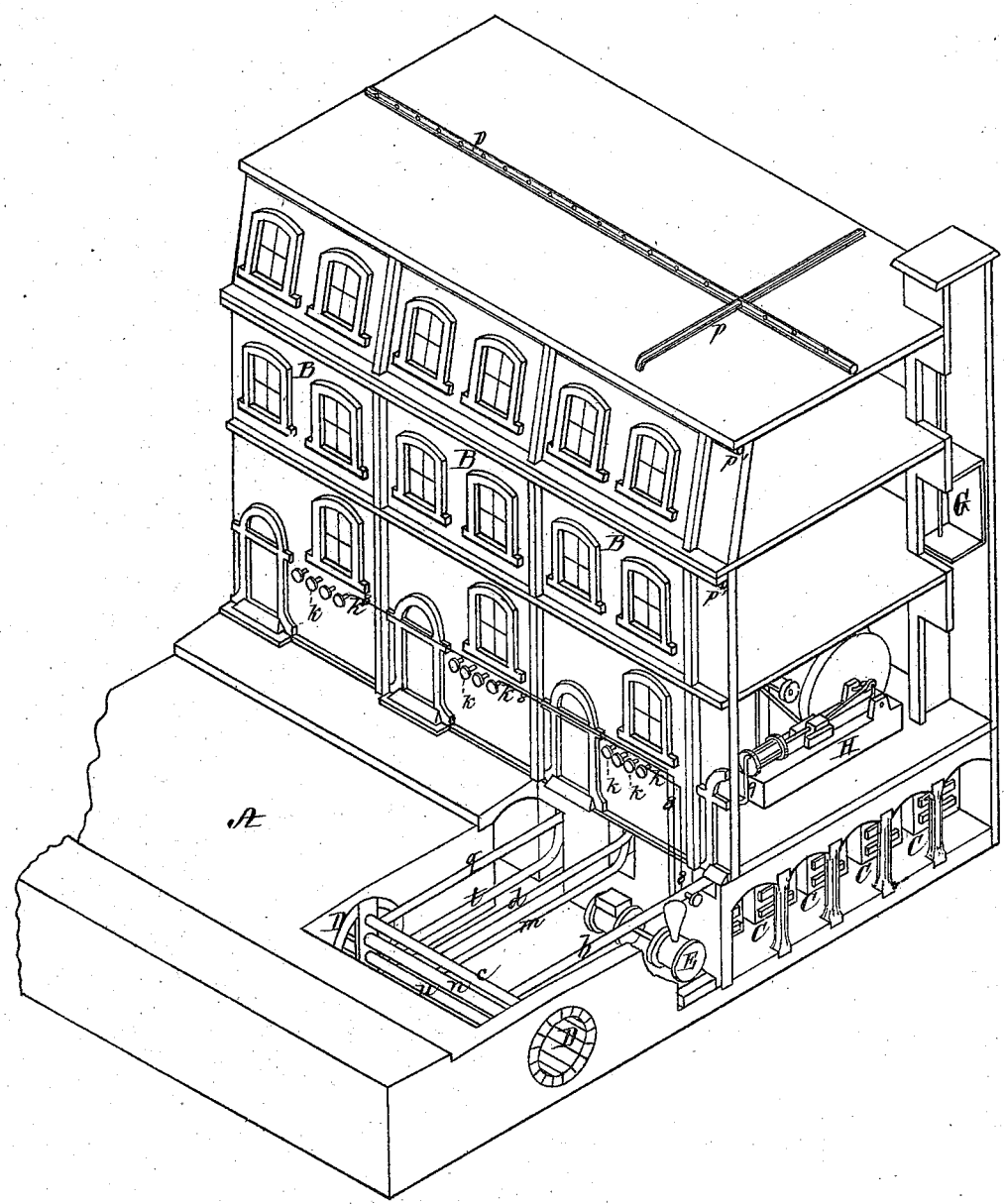
Figure 4:
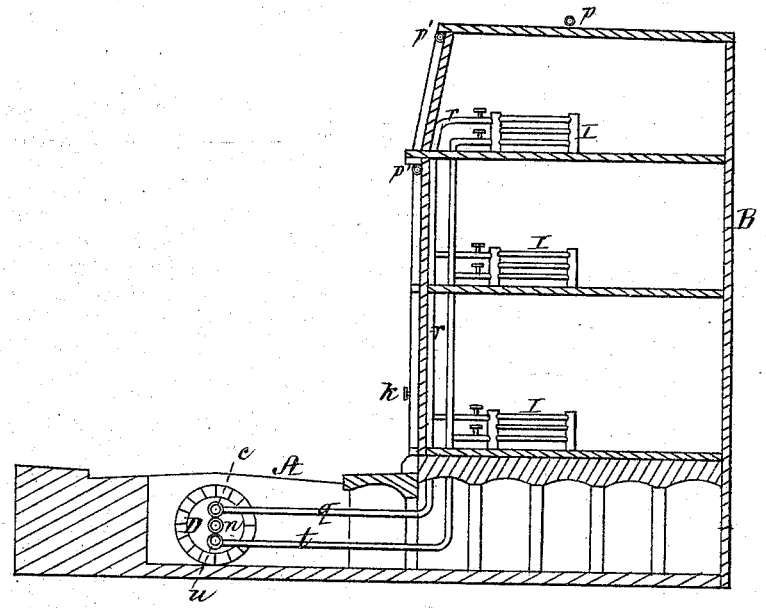
Figure 5:
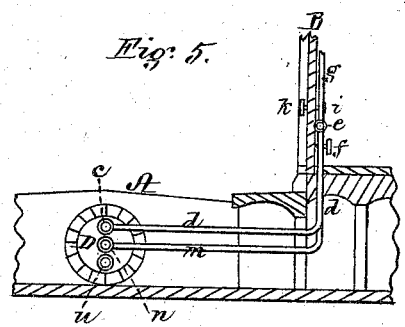

Figure 1 is a perspective view illustrating my invention. Fig. 2 is a transverse vertical section, representing a street with a building thereon having the steam boilers or generators thereunder, and showing the application of my system. Fig. 3 is a longitudinal vertical section on the line $x$ $x$ of Fig. 2. Fig. 4 is a transverse vertical section on the line $y$ $y$ of Fig. 3; Fig. 5, detail in section.

This invention has for its object to supply buildings in a city or district with steam for extinguishing fires, for motive power, and for heating purposes, &c.; and consists in a complete system embracing a series of pipes or mains, radiating from a group of boilers or generators centrally located through the several streets or passages; the buildings to be supplied being provided with pipes extending in various directions, and communicating with the street-mains; these pipes being provided at various points with means for attaching hose thereto, or with a series of perforated pipes or sprinklers, through which steam can be forced into any room to extinguish a fire therein; branch-pipes being provided for furnishing steam for motive power and heating purposes, the pipes provided with means for attaching hose, or with sprinklers, also communicating with street pipes or mains supplied with water at the desired pressure, so as to allow of water being ejected, instead of steam, when the fire has gained too much headway to be extinguished thereby.

To enable others skilled in the art to understand and use my invention, I will proceed to describe the manner in which I have carried it out.

In the said drawings, A represents a street, and B a block of buildings thereon to be supplied with steam from a group of boilers or generators, C, located in the basement of one of the buildings, or in some other central position. The steam-pipes from the boilers or generators are connected by one or more pipes, $b$, with a principal steam pipe or main, $c$, placed within a brick conduit or tunnel, D, built under the street A. This main extends through the various streets of the district in the same manner as the ordinary water and gas pipes, and is intended to be covered with felt or other suitable material to retain the heat, and prevent the condensation of the steam and consequent reduction of pressure. Each building throughout the district is supplied with steam from the main $c$ through a pipe, $d$, which communicates with a short horizontal pipe or chamber, $e$, placed on the inside of the front wall of the building; the admission of steam to the pipe $e$ being controlled by a valve, $f$, in the pipe $d$ immediately below the chamber $e$. A series of vertical pipes, $g$, one for each story and one for the roof, rise from the horizontal pipe or chamber $e$, and the upper end of each pipe $g$ has connected therewith perforated pipes or sprinklers $p$, fastened in any desirable position to the ceilings, the sprinklers attached to the longest pipe $g$ being secured upon the roof. (See Fig. 1.) The outside of the building is also provided with sprinklers $p'$, connected with the pipes $g$. Each of the vertical pipes $g$ is provided at or near its lower end with a valve or stop-cock, $i$, the stem of which projects through the front wall, so as to be accessible from the outside of the building; and the handles $k$ of these valves should be inclosed within an iron box or casing provided with a lock and key.

By means of these pipes and sprinklers with their valves steam can be forced into any portion of the building where a fire may break out, and, if this portion is closed so as to confine the steam, it will smother the flame without material damage to the goods therein.

If the windows have been broken in, or if the fire has gained too much progress before discovery, water may be admitted to the vertical pipes $g$ and ejected through the sprinklers instead of steam by simply opening a valve, $l$, Fig. 3, in a pipe, $m$, leading from the horizontal pipe e to a water-main, n, placed in the conduit or tunnel D under the steam-main c, the required degree of pressure being maintained within the water-main n by one or more steam-pumps, E, which are intended to be operated when occasion requires. Should, however, the head or pressure of water in the ordinary city service-pipes be sufficient, the pipe m may be connected therewith, and the main n and steam-pumps be dispensed with.

By the employment of one set of pipes only for both steam and water, instead of two separate and independent sets of pipes—one for steam and one for water—I am enabled to effect a very considerable saving in the cost of construction, repairs, &c., and also to economize space.

In connection with the above-described system I intend to establish telegraphic communication between each building and the central office or boiler station by means of wires S, whereby the engineer may be notified to start the pumps to produce the required water-pressure in the main n.

Instead of a series of perforated pipes or sprinklers leading to various places in the interior and on the exterior of the building, a stand-pipe suitably connected with both the water and steam mains, and leading up on the outside or through the inside of the building, may be employed, short forks or branches issuing from the stand-pipe at various heights in order that hose may be connected therewith for directing water upon a fire in any part of the building, the communication with the supply of water in the stand-pipe being controlled by valves, one in each fork or branch; and in case the fire is in an incipient state, steam may be forced through the ends of the branch pipes so as to fill the apartment and smother the fire in the same manner as where the sprinklers above described are employed.

The elevator G, and any other machinery within the building, may be operated by an engine, H, driven by steam from the supply-pipe d, conducted through an auxiliary pipe, 9.

The steam for heating the building is introduced from the street-main c by means of a pipe, q, communicating with the pipe r, branches leading therefrom to the radiators I on the different floors. In practice, however, I intend to dispense with the pipe q and take the steam for heating, cooking, &c., from the supply-pipe d. The water of condensation from the steam heating or cooking apparatus passes down a pipe, t, into a main waste-pipe, u, placed in the conduit or tunnel D under the main n, the water flowing into a tank at the central station, from which it is returned to the boilers.

By concentrating a large number of boilers in one place under the control of first-class engineers, instead of scattering them in various buildings under management more or less indifferent, all risk of fire will be removed, while an immense saving in the salaries of engineers may be effected and great efficiency secured, as well as a saving of all care and trouble to the occupant of the building. Steam for motive power, &c., will be constantly maintained in the boilers, and will, therefore, be ready for instant use night and day throughout the year.

It will be seen that by the introduction of the above-described system of steam and water within a city or district fire can be promptly suppressed before it has gained the dangerous headway, so often a consequence of the unavoidable delays of the present municipal fire apparatus. My system of apparatus, being always ready, would be at work and a fire extinguished with the use of the smallest possible quantity of water before the city engines could get to work, and with far less damage than now results from flooding buildings with misdirected volumes of water.

What I claim as my invention, and desire to secure by Letters Patent, is—

The steam system described, consisting of a series of pipes or mains extending through a city or district and connected with centrally-located boilers and with pipes applied to buildings, the said pipes being connected with the water-main and provided with valves, as specified, whereby the pipes may be furnished with a supply of steam or water for extinguishing fires, all substantially as set forth.

Witness my hand this 22d day of March, A. D. 1873.

JOHN A. COLEMAN.

In presence of—
  P. E. TESCHEMACHER,
  N. W. STEARNS.